(12) United States Patent
Han et al.

(10) Patent No.: US 9,014,745 B2
(45) Date of Patent: Apr. 21, 2015

(54) RADIO COMMUNICATION SYSTEM, RADIO COMMUNICATION METHOD, AND BASE STATION

(71) Applicant: Hitachi, Ltd., Tokyo (JP)

(72) Inventors: Changho Han, Tokyo (JP); Shiro Mazawa, Tokyo (JP); Michio Iguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 372 days.

(21) Appl. No.: 13/676,909

(22) Filed: Nov. 14, 2012

(65) Prior Publication Data
US 2013/0143616 A1 Jun. 6, 2013

(30) Foreign Application Priority Data

Dec. 2, 2011 (JP) ................. 2011-264201

(51) Int. Cl.
H04B 7/00 (2006.01)
H04W 52/18 (2009.01)
H04W 52/26 (2009.01)
H04W 52/24 (2009.01)
H04W 52/32 (2009.01)
H04W 52/36 (2009.01)

(52) U.S. Cl.
CPC ............ *H04W 52/18* (2013.01); *H04W 52/244* (2013.01); *H04W 52/267* (2013.01); *H04W 52/325* (2013.01); *H04W 52/367* (2013.01); Y02B 60/50 (2013.01)

(58) Field of Classification Search
CPC . H04W 52/18; H04W 52/244; H04W 52/267; H04W 52/325; H04W 52/367; Y02B 60/50
USPC ..................... 455/69, 522; 370/318
See application file for complete search history.

(56) References Cited

U.S. PATENT DOCUMENTS

2014/0146756 A1* 5/2014 Sahin et al. ............... 370/329

OTHER PUBLICATIONS

"cdma2000 High Rate Packet Data Air Interface Specification", 3rd Generation Partnership Project 26 "3GPP2", 3GPP2 C.S0024-B, Version 1.0, Apr. 2006.

* cited by examiner

Primary Examiner — Raymond Dean
(74) Attorney, Agent, or Firm — Volpe and Koenig, P.C.

(57) ABSTRACT

When a mobile station registered at a closed-type femtocell base station is in a connection state in a cell area covered by the femtocell base station, the transfer power of the femtocell base station for a cell identification signal is adjusted according to one scale estimating the receiving quality of the cell identification signal at the mobile station. When no mobile station is located in the cell area covered by the femtocell base station, the cell identification signal is sent with the minimum transmission power necessary for a mobile station to make a call in the cell area to reduce the power consumption of the femtocell base station and also to reduce interference with other macrocell base stations and other femtocell base stations.

15 Claims, 18 Drawing Sheets

| TIME | T_0 | T_1 | T_2 | T_3 | T_4 |
|---|---|---|---|---|---|
| CONNECTED MOBILE STATION | None | MOBILE STATION A (AT D_1) MOBILE STATION B (AT D_2) | MOBILE STATION A (AT D_1) | MOBILE STATION A (AT D_1) MOBILE STATION B (AT D_3) | None |

| TIME PERIOD | a | b | c | d | e | f | g | h | i | j | k | l | m | n | o | p | q | r |
|---|---|---|---|---|---|---|---|---|---|---|---|---|---|---|---|---|---|---|
| MOBILE STATION A | - | - | - | 12 | 12 | 12 | 12 | 12 | 12 | 12 | 12 | 12 | 12 | 12 | 12 | 12 | 12 | - |
| MOBILE STATION B | - | - | - | 12 | 12 | 12 | 11 | 12 | - | - | - | 10 | 11 | 12 | 12 | 11 | 12 | - |

FIG.18

RADIO COMMUNICATION SYSTEM, RADIO COMMUNICATION METHOD, AND BASE STATION

CLAIM OF PRIORITY

The present application claims priority from Japanese patent application JP 2011-264201 filed on Dec. 2, 2011, the content of which is hereby incorporated by reference into this application.

BACKGROUND OF THE INVENTION

1. Field of the Invention

The present invention relates to radio communication systems, radio communication methods, and base stations, and more particularly, to a radio communication system, a radio communication method, and a small-area base station, such as a femtocell base station, which achieve a reduction in power usage and a reduction in interference.

2. Description of the Related Art

In conventional mobile communication systems, base stations (BSs) are radio communication equipments that provide connections in order to communicate with mobile stations (MSs). Most of them are large-area radio base stations called macrocell base stations having cell radii of about several hundred meters to several tens of kilometers.

In recent years, smartphones and tablet PCs have been widely used, and data communication has been rapidly increased. As a result, the load on macrocell base stations have been rapidly increased. In order to cope with this heavy traffic, many new off-loading technologies have been researched that makes communication quality stable by transferring the traffic to other communication systems. One idea of the technology is femtocell base stations. Femtocell base stations are one type of base stations used in radio communication systems and are small-area base stations having cell radii of about as small as several meters to as large as several tens of meters. Femtocell base stations can provide communication services through broadband lines already installed, such as asymmetric digital subscriber lines (ADSLs), coaxial cables, and optical fiber. Therefore, femtocell base stations allow data traffic to be off-loaded and can also cover the cell areas in indoor facilities which radio waves do not reach easily, such as houses and offices, while keeping the mobility of mobile stations. Since these femtocell base stations are installed directly by users in houses and offices, communication providers can reduce the operation cost. When communication providers use such femtocell base stations effectively to improve the communication quality of cell areas where existing macrocell base stations cannot cover, the communication providers provide better communication services for the communication subscribers.

These femtocell base stations can be roughly divided into three types, open access, closed access, and hybrid access modes. Open-access-mode femtocell base stations allow any mobile stations to use communication services freely without prior registration. Closed-access-mode femtocell base stations provide communication services only for mobile stations registered in advance. Hybrid-access-mode femtocell base stations apply different qualities of service (QoS) to mobile stations registered in advance and mobile stations without prior registration. These types of femtocell base stations can be implemented with the use of the high rate packet data (HRPD) technology using cdma 2000, described in C. S0024 cdma 2000 High Rate Packet Data Air Interface Specification by the third generation partnership project 2 (3GPP2).

SUMMARY OF THE INVENTION

In conventional femtocell base stations, a cell identification signal was sent with constant power irrespective of the receiving quality of the cell identification signal at a mobile station. In other words, even if a mobile station had a sufficient receiving quality of a cell identification signal, the transmission power for the cell identification signal sent from the femtocell base station to the mobile station was always set constant, and the cell area of the femtocell base station, determined by the power intensity of the cell identification signal, was always the same.

As described above, since a conventional femtocell base station sent a cell identification signal with constant transmission power to a mobile station, mainly the following two problems occurred.

The first problem was that a conventional femtocell base station sometimes consumed power more than necessary because the femtocell base station sent a cell identification signal with constant transmission power irrespective of the receiving quality of the cell identification signal at a mobile station or irrespective of whether any mobile station was located in the cell area of the femtocell base station.

The second problem was highly possible interference with other base stations caused by a wide overlapping area between the cell area where communication services were provided, of a conventional femtocell base station and the cell area of another femtocell base station located nearby or the cell area of another base station located nearby, since the femtocell base station sent the cell identification signal with constant transmission power. Since a conventional femtocell base station sent a cell identification signal with constant transmission power to cover an area more than necessary, irrespective of the receiving quality of the cell identification signal at a mobile station or irrespective of whether any mobile station was located in the cell area of the femtocell base station, easily causing interference with other base stations in some cases.

As described above, conventional femtocell base stations sent a cell identification signal with constant transmission power irrespective of the receiving quality of the cell identification signal at a mobile station or irrespective of whether any mobile station was located in the cell area of the femtocell base station. Therefore, power was consumed wastefully at the femtocell base station and interference with other base stations was highly possible in some cases.

Accordingly, it is an object of the present invention to reduce the power consumption of a femtocell base station and also to reduce interference with another macrocell base station or another femtocell base station, by sending downstream signals that include a pilot signal and data, with the minimum transmission power necessary for the femtocell base station to provide communication service irrespective of whether a mobile station exists in the cell area covered by the femtocell base station.

To solve the above-described problems, the present invention provides a control method for transmission power for all downstream signals that include cell identification signals (control signals and control channel signals) and data (data channel signals) to be sent from a closed-type femtocell base station according to the receiving quality of the cell identification signals at a mobile station connected to the femtocell base station.

For example, conventionally, pilot signals (control signals and control channel signals) such as a cell identification signal were sent from a base station without reducing the transmission power, whereas only data was sent with reduced transmission power. In contrast, both data and the pilot signals such as a cell identification signal are sent from a base station with reduced transmission power in the present invention. With this reduction in transmission power, the power consumption of the femtocell base station can be reduced and interference with other base stations can be reduced.

A closed-type femtocell base station according to the present invention includes means for detecting information about a mobile station registered in advance at the femtocell base station, means for storing the detected information about the mobile station, means for detecting information about the receiving quality of a received cell identification signal, from the mobile station, means for storing the detected information about the receiving quality of the cell identification signal at each mobile station, means for setting the transmission power for the cell identification signal by using these pieces of information, and transmission power control means for sending all downstream signals that include a pilot signal and data with the set transmission power.

With this configuration, when a mobile station registered at the closed-type femtocell base station is connected to the femtocell base station within the cell area covered by the femtocell base station, the transmission power for the cell identification signal and that for data are adjusted in the femtocell base station according to one scale that estimates the receiving quality of the cell identification signal at the mobile station. If there is no mobile station in the cell area covered by the femtocell base station, the base station sends the cell identification signal and data with the minimum transmission power necessary for a mobile station to make a call within the cell area.

According to the first solving means of the present invention, there is provided a radio communication system comprising a base station that provides communication service only for a plurality of mobile stations registered in advance,
the base station comprising:
a transmission power setting section for setting transmission power for a control channel signal and a data channel signal according to a transfer rate received from one or a plurality of mobile stations and the connection states of the one or the plurality of mobile stations; and
a transmission power control section for controlling the transmission power for the control channel signal and the data channel signal according to the transmission power setting section;
wherein the transmission power setting section sets the transmission power for the control channel signal and the data channel signal to power required by a mobile station that requires the highest power in order to obtain the maximum data rate stipulated by the base station or to power necessary for a mobile station having the lowest transfer rate to satisfy a desired signal quality determined in advance and a desired transfer rate determined in advance, when all of the plurality of mobile stations registered at the base station are in connection states; and
the transmission power setting section sets the transmission power for the control channel signal and the data channel signal to whichever is the higher of the minimum power necessary for each mobile station to make a call to the base station or power required by a mobile station that requires the highest power in order to obtain the maximum data rate stipulated by the base station, or whichever is the higher of the minimum power necessary for each mobile station to make a call to the base station or the power necessary for a mobile station having the lowest transfer rate to satisfy the desired quality and the desired transfer rate, when only one or some of the plurality of mobile stations registered at the base station is in a connection state.

According to the second solving means of the present invention, there is provided a radio communication method in a radio communication system comprising a base station that provides communication service only for a plurality of mobile stations registered in advance,
wherein the base station sets the transmission power for the control channel signal and the data channel signal to power required by a mobile station that requires the highest power in order to obtain the maximum data rate stipulated by the base station or to power necessary for a mobile station having the lowest transfer rate to satisfy a desired quality determined in advance and a desired transfer rate determined in advance, when all of the plurality of mobile stations registered at the base station are in connection states; and
the base station sets the transmission power for the control channel signal and the data channel signal to whichever is the higher of the minimum power necessary for each mobile station to make a call to the base station or power required by a mobile station that requires the highest power in order to obtain the maximum data rate stipulated by the base station, or whichever is the higher of the minimum power necessary for each mobile station to make a call to the base station or the power necessary for a mobile station having the lowest transfer rate to satisfy the desired quality and the desired transfer rate, when only one or some of the plurality of mobile stations registered at the base station is in a connection state.

According to the third solving means of the present invention, there is provided a base station that provides communication service only for a plurality of mobile stations registered in advance, comprising:
a transmission power setting section for setting transmission power for a control channel signal and a data channel signal according to a transfer rate received from one or a plurality of mobile stations and the connection states of the one or the plurality of mobile stations; and
a transmission power control section for controlling the transmission power for the control channel signal and the data channel signal according to the transmission power setting section;
wherein the transmission power setting section sets the transmission power for the control channel signal and the data channel signal to power required by a mobile station that requires the highest power in order to obtain the maximum data rate stipulated by the base station or to power necessary for a mobile station having the lowest transfer rate to satisfy a desired quality determined in advance and a desired transfer rate determined in advance, when all of the plurality of mobile stations registered at the base station are in connection states; and
the transmission power setting section sets the transmission power for the control channel signal and the data channel signal to whichever is the higher of the minimum power necessary for each mobile station to make a call to the base station or power required by a mobile station that requires the highest power in order to obtain the maximum data rate stipulated by the base station, or whichever is the higher of the minimum power necessary for each mobile station to make a call to the base station or the power necessary for a mobile station having the lowest transfer rate to satisfy the desired quality and the desired transfer rate, when only one or some of the plurality of mobile stations registered at the base station is in a connection state.

It is possible, according to the present invention, to reduce the power consumption of a femtocell base station and also to reduce interference with another macrocell base station or another femtocell base station, by sending downstream signals that include a pilot signal and data, with the minimum transmission power necessary for the femtocell base station to provide communication service irrespective of whether a mobile station exists in the cell area covered by the femtocell base station.

Furthermore, according to the present invention, since both the transmission power for a pilot signal and that for data are controlled at the same time, the power transmission control is performed more easily than when the transmission powers for data and pilot signal are separately controlled as in the conventional mobile communication technology. Therefore, a relatively simple hardware and/or software configuration can be used in the present invention.

BRIEF DESCRIPTION OF THE DRAWINGS

FIG. 15 shows mobile stations connected to the femtocell base station at each time in the embodiment of the present invention.

FIG. 18 shows the downstream data rate received by the femtocell base station from the mobile stations in the embodiment of the present invention.

DESCRIPTION OF THE PREFERRED EMBODIMENTS

An embodiment of the present invention will be described below with reference to the drawings according to the high rate packet data (HRPD) technology using the cdma 2000 communication technology, described in C. S0024 cdma 2000 High Rate Packet Data Air Interface Specification by the third generation partnership project 2 (3GPP2).

1. System Outline

Figure 1:
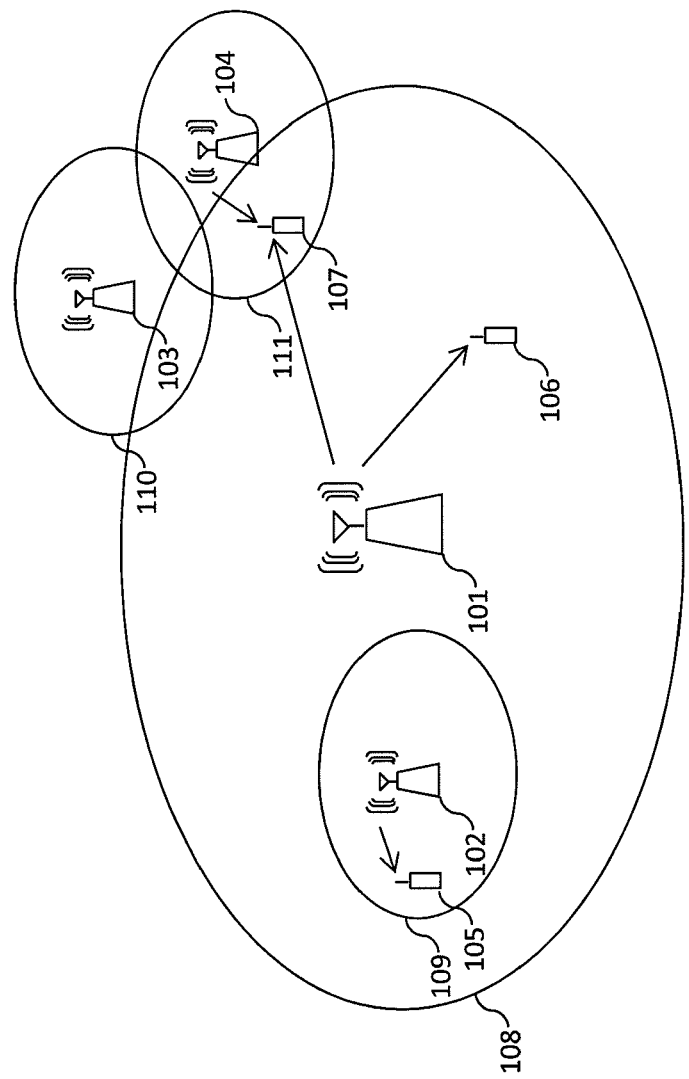
FIG. 1 is a view showing an example configuration of a mobile communication system according to an embodiment of the present invention.

FIG. 1 shows one of the network configuration examples in a mobile communication system according to an embodiment of the present invention which consists of a macrocell base station and femtocell base stations. Illustrated in FIG. 1 are a macrocell base station 101, femtocell base stations 102, 103, and 104, mobile stations 105, 106, and 107, the cell area 108 of the macrocell base station, and the cell areas 109, 110, and 111 of the femtocell base stations. The femtocell base station 102 is disposed right inside of the cell area of the macrocell base station 101, and the femtocell base stations 103 and 104 are disposed around the boundary of the cell area of the macrocell base station 101. The mobile terminal 105 is communicating with the femtocell base station 102, the mobile station 106 is communicating with the macrocell base station 101, and the mobile station 107 is communicating with the macrocell base station 101 and the femtocell base station 104.

Figure 2:
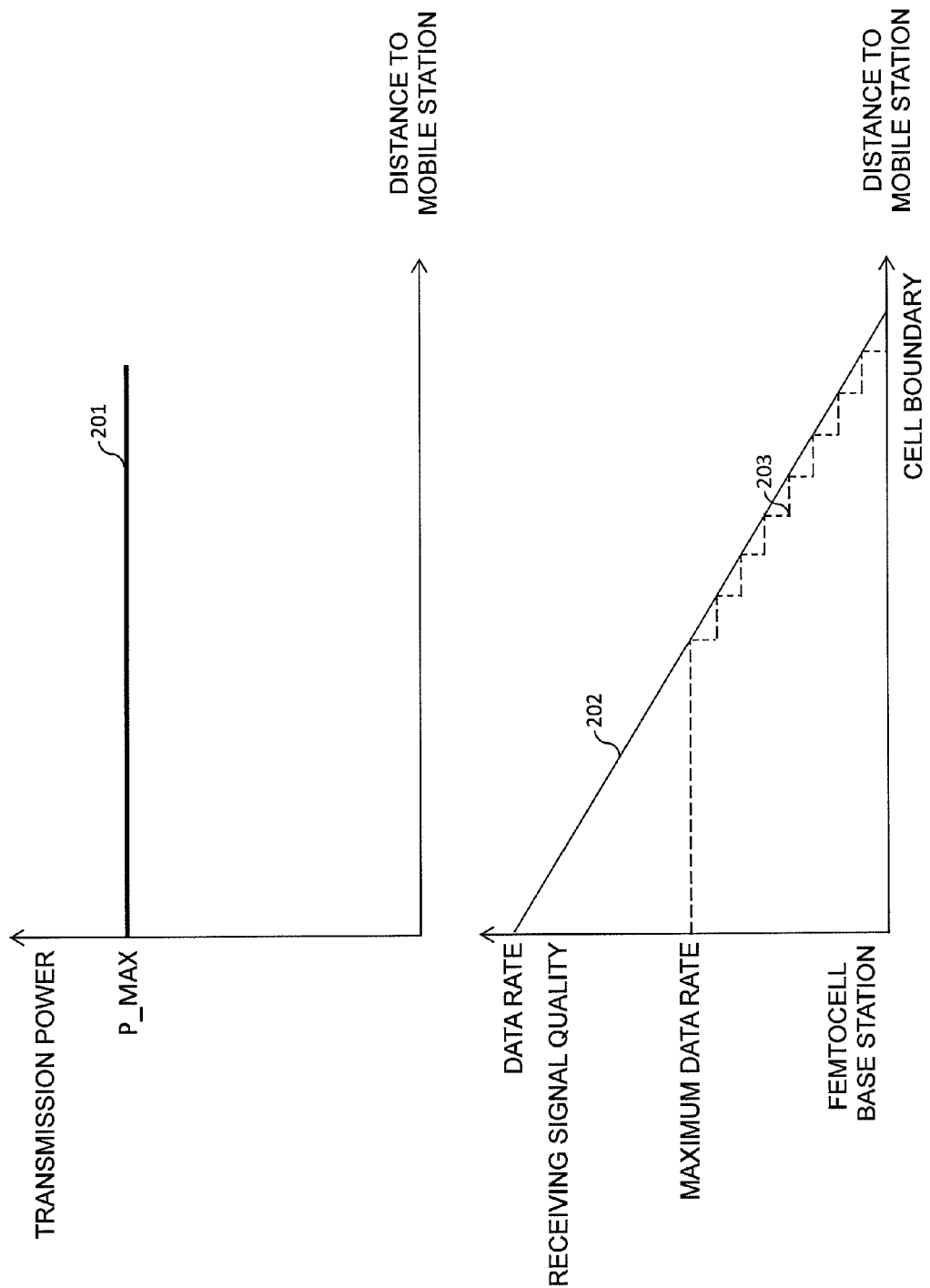
FIG. 2 shows the relationship between the transmission power and the downstream data rate of a conventional femtocell base station.

FIG. 2 includes a graph indicating constant transmission power 201 stipulated in a femtocell base station and a graph indicating a downstream data rate 203 calculated according to the receiving quality 202 of a pilot signal received from the femtocell base station in a conventional femtocell base station system. The maximum data rate means, for example, the maximum data rate that can be received from the femtocell base station. In FIG. 2, the downstream data rate 203 is illustrated assuming that a path loss occurs between the femtocell base station and a mobile station in proportion to the distance from the femtocell base station to the mobile station, and as a result, the receiving quality 202 of the pilot signal at the mobile station is reduced as the distance between the femtocell base station and the mobile station get larger. According to FIG. 2, the conventional femtocell base station sent a signal to a mobile station with constant transmission power P_MAX stipulated in the femtocell base station irrespective of the receiving quality 202 of the pilot signal at the mobile station. In such case, when the mobile station was close to the femtocell base station and the receiving quality of the pilot signal at the mobile station was very high, the receiving signal quality 202 at the mobile station was sufficiently high. However, the downstream data rate 203 obtained at the mobile station had an upper limit, keeping the transmission power of the femtocell base station constant at all times was not efficient in terms of power consumption. In addition, since all downstream signals were always sent with constant power, interference was often generated by the transmission power of the femtocell base station with another macrocell base station or another femtocell base station located nearby, more than necessary.

Figure 3:
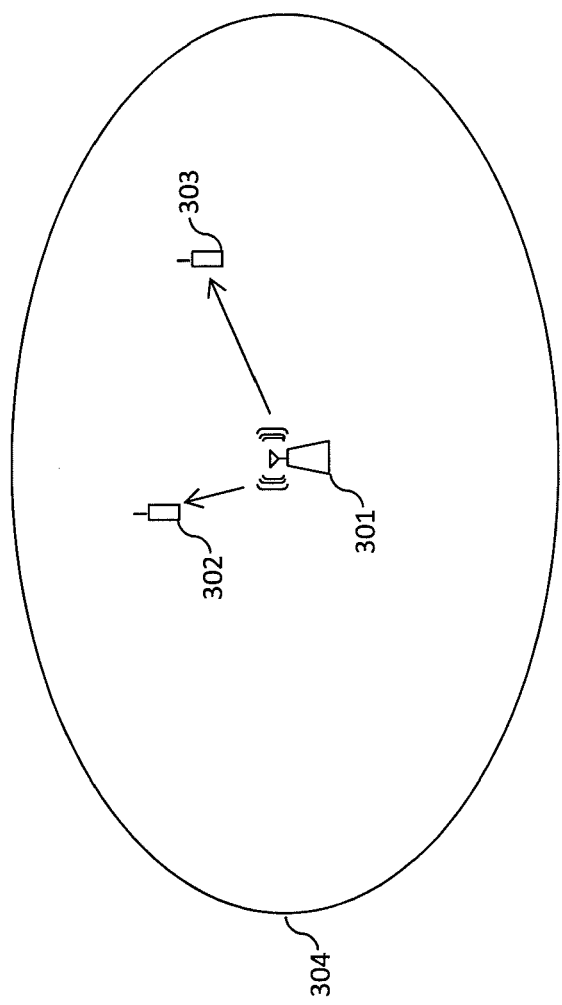
FIG. 3 is a view showing the system configuration of a conventional femtocell base station.

FIG. 3 shows a conventional closed-type femtocell base station 301 and the cell area 304 determined by the femtocell base station 301. FIG. 3 also shows that a mobile station 302 and a mobile station 303 both registered in advance at the femtocell base station 301 are communicating with the femtocell base station 301 in the cell area 304. The cell area 304 was determined when the femtocell base station 301 sent a pilot signal with constant power stipulated in the femtocell base station 301 irrespective of the downstream data rate (data rate control, DRC) calculated according to the receiving quality of a pilot signal, which is a cell identification signal, received by a mobile station. Even when the receiving quality of all downstream signals that included a pilot signal and data was high and a sufficient downstream data rate was maintained because the mobile stations 302 and 303 were located close to the femtocell base station 301, the femtocell base station 301 always sent signals with constant power. Therefore, it is expected that power was consumed wastefully in the femtocell base station 301. In addition, if the femtocell base station 301 was in the cell area of a macrocell base station as the femtocell base station 102 shown in FIG. 1, which is in the cell area of the macrocell base station 101, the interference between the femtocell base station 102 and the macrocell base station 101 occurred with high possibility by mutual transmission signals.

Figure 4:
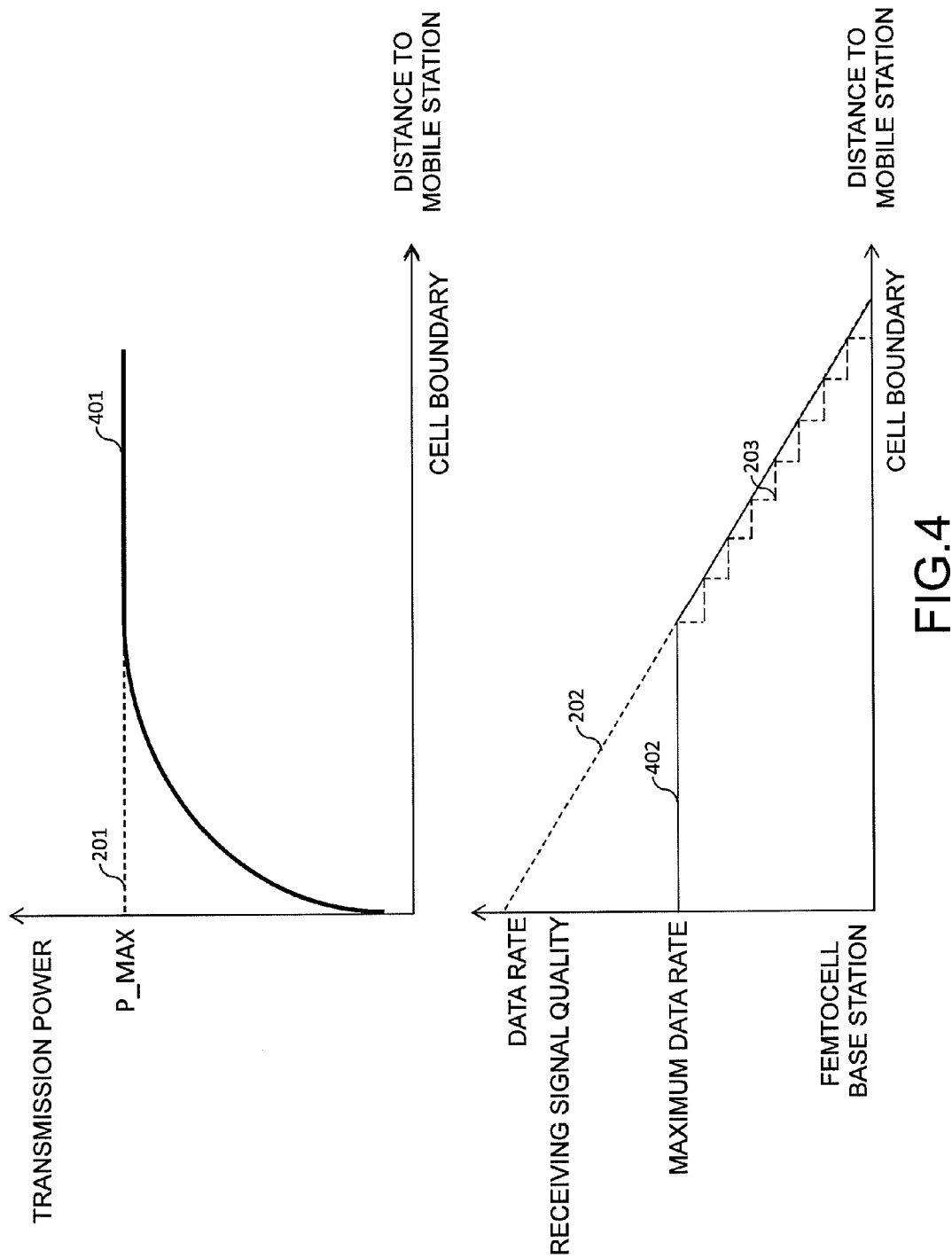
FIG. 4 shows the relationship between the transmission power and the downstream data rate of a femtocell base station according to the present embodiment.

FIG. 4 shows the conventional transmission power 201 of the closed-type femtocell base station; transmission power 401 according to the present embodiment used to solve the above-described problems; the conventional receiving signal quality 202 at a mobile station; the receiving signal quality 402, caused by the transmission power 401 of the femtocell base station according to the present embodiment at the mobile station; and a downstream data rate 203 calculated according to the receiving signal quality 402 in the present or 202 in the conventional embodiment. As described before, only mobile stations registered in advance at a closed-type femtocell base station can connect to the femtocell base station, the femtocell base station can have information about mobile stations which can connect thereto and the number of those mobile stations. As a result, when all mobile stations registered in advance at the femtocell base station were in connection states, and when all the mobile stations were connected near the femtocell base station, the femtocell base station conventionally sent all downstream signals that included a pilot signal and data with the maximum transmission power although the mobile stations could maintain sufficient service quality, consuming the power more than necessary in some cases. To solve this problem, in the present embodiment, the transmission power for all downstream signals that include a pilot signal and data from the femtocell base station is controlled and the receiving signal quality at a mobile station is adjusted accordingly, to maintain the conventional downstream data rate 203. A detailed transmission power setting algorithm will be described later. The femtocell base station can obtain the downstream data rate obtained at a mobile station by receiving an upstream signal from the mobile station. According to a transmission power control method of the present embodiment, the transmission power of all downstream signals that include a pilot signal and data from the femtocell base station is reduced according to the downstream data rate calculated from the receiving signal quality 402 at a mobile station, in a range where the downstream data rate is not affected, reducing the power consumption of the femtocell base station and interference with other macro-cell base stations and other femtocell base stations while maintaining the service quality at the same level as in conventional cases.

Figure 5:
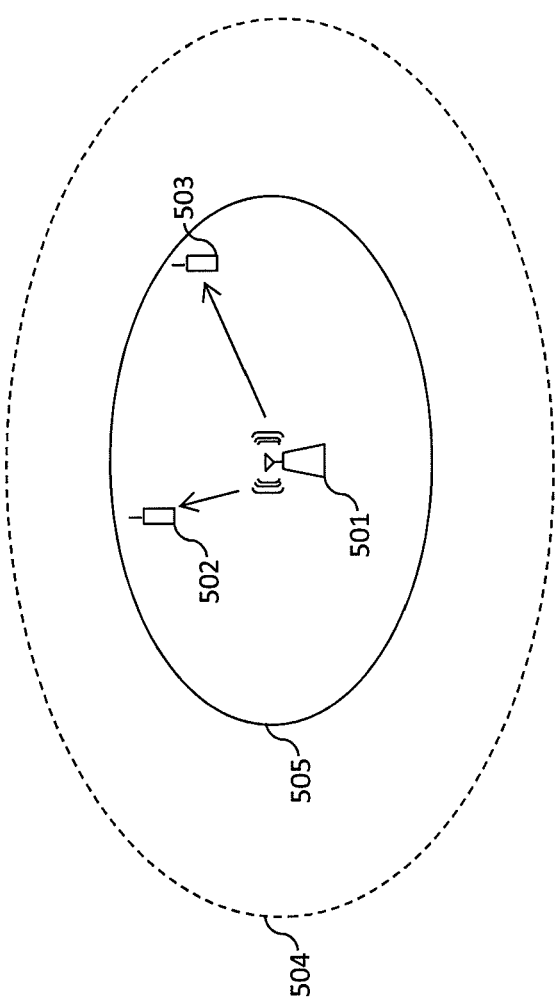
FIG. 5 is a view showing the system configuration of the femtocell base station system according to the present embodiment.

FIG. 5 shows a closed-type femtocell base station 501 according to the present embodiment and a cell area 505 determined when the transmission power for mobile stations is reduced according to the downstream data rate calculated at the femtocell base station 501. When the downstream data rate calculated according to the receiving quality received from each of mobile stations 502 and 503, of a pilot signal, which is a cell identification signal, is in an appropriate downstream data rate range, the femtocell base station 501 reduces the transmission power of all downstream signals that include a pilot signal to reduce the power consumption thereof. In the present embodiment, when the femtocell base station 501 reduces the transmission power for all downstream signals, it reduces a possible cell area 504 to the cell area 505, and as a result, interference with other macrocell base stations and other femtocell base stations is reduced. A specific method therefore will be described below with reference to the drawings.

2. Power Control
2.1 Case 1: When No Registered Mobile Station is in a Connection State A specific method for transmission power control in a closed-type femtocell base station according to the present embodiment, with the use of the downstream data rate calculated according to the receiving quality of a pilot signal at a mobile station will be described below with reference to FIG. 6 to FIG. 11.

Figure 6:
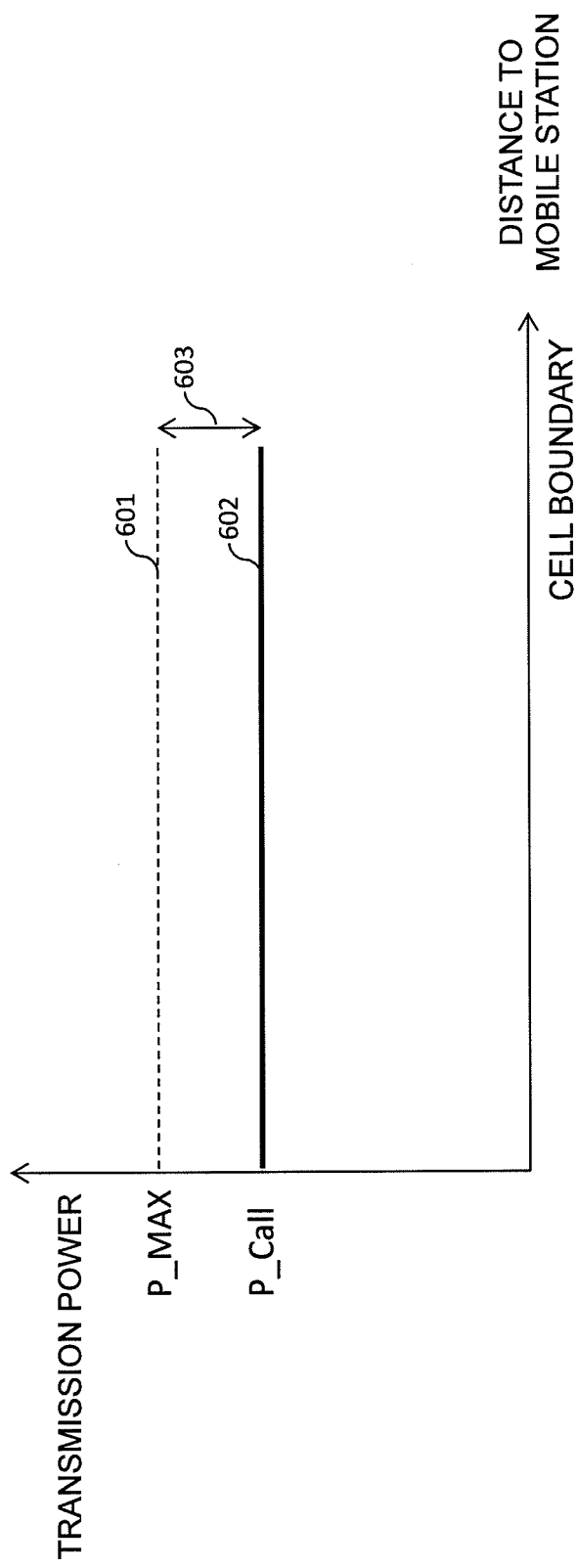
FIG. 6 shows transmission power control used in the femtocell base station according to the present embodiment when none of all mobile stations is in a connection state or when the base station is activated.

FIG. 6 shows transmission power P_MAX (601) and P_Call (602) stipulated in the femtocell base station. P_MAX means the transmission power stipulated to obtain the maximum data rate in the cell area determined by the femtocell base station. P_Call means the minimum transmission power necessary for a mobile station to make a call in the cell area determined by the femtocell base station. Therefore, the transmission power P_MAX and P_Call differs depending on the femtocell base station. The minimum power is determined appropriately by a user or a vendor according to the environment or system configurations, when adjusting the cover range of each base station at the installation or introduction stage of base stations, such as the femtocell base station, for example. In FIG. 6, when none of mobile stations registered at the femtocell base station is in a connection state in the cell area of the femtocell base station, the transmission power for a pilot signal needs to be set to P_Call, which is the minimum transmission power necessary for a mobile station to make a call at any location in the cell area. When no mobile station is located in the cell area, if the transmission power is set to lower than P_Call, the femtocell base station may be unable to detect a mobile station if it appears in the cell area. On the contrary, when no mobile station is located in the cell area, if the transmission power is set to higher than P_Call, the amount of power higher than P_Call is wasted. Therefore, the transmission power is set to P_Call as the initial setting when the femtocell base station is activated. By changing the transmission power of the femtocell base station from the conventional level, P_MAX, to P_Call with the power control described above, the power consumption indicated by a reference numeral 603 in the figure is reduced in the femtocell base station. In addition, as described with reference to FIG. 5, according to the present embodiment, the cell area of the femtocell base station is reduced from the conventional cell area 504 to the cell area 505, to which the present embodiment is applied, interference with other macrocell base stations and other femtocell base stations can be reduced. In some cases, P_Call, the minimum transmission power necessary for a mobile station to make a call in the cell area of the femtocell base station, is the same as P_MAX, constant transmission power stipulated in the femtocell base station.

2.2 Case 2: When All Registered Mobile Stations are in Connection States

Figure 7:
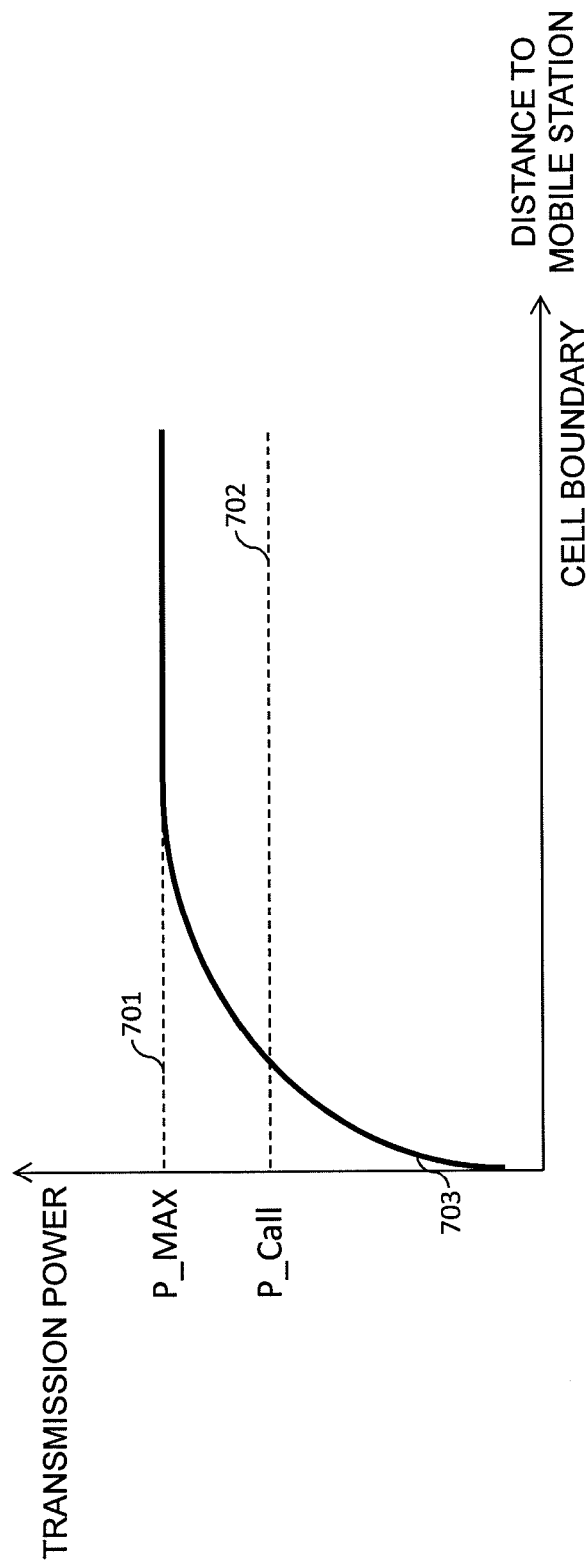
FIG. 7 shows transmission power control used in the femtocell base station according to the present embodiment when all mobile stations are in connection states.
Figure 8:
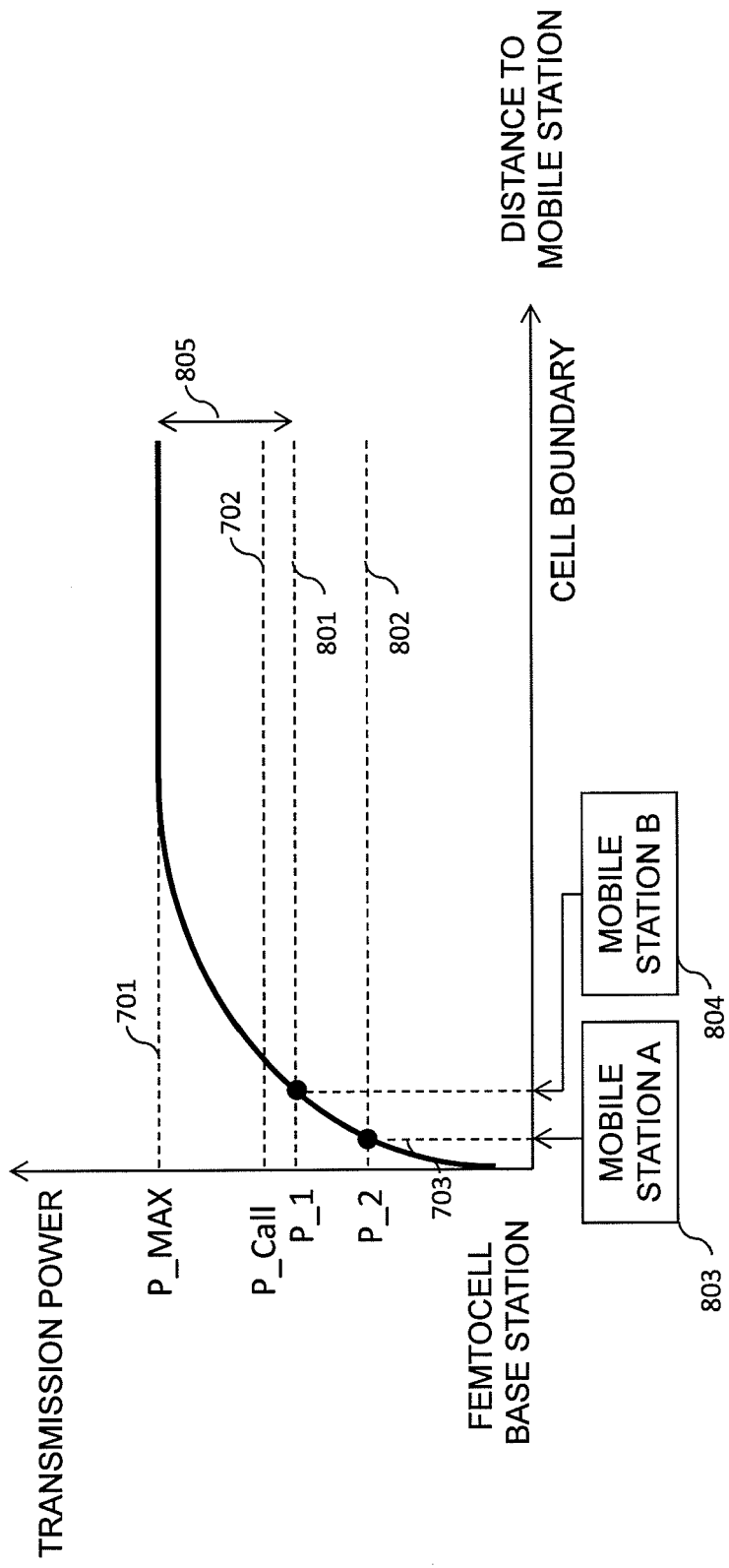
FIG. 8 shows transmission power control used in the femtocell base station according to the present embodiment when all mobile stations are in connection states.

FIG. 7 and FIG. 8 show a transmission power control method and a transmission power control example, respectively, used when all mobile stations are registered in advance at a corresponding closed-type femtocell base station and all the mobile stations are in connection states in a closed-type femtocell base station system according to the present embodiment.

FIG. 7 shows constant transmission power stipulated in the femtocell base station, P_MAX (701); the minimum transmission power necessary for a mobile station to make a call in the cell area of the femtocell base station, P_Call (702); and transmission power 703 of the femtocell base station, determined according to the receiving signal quality and the downstream data rate at a mobile station. The transmission power 703 is the transmission power for all downstream signals that include a pilot signal and data, sent from the femtocell base station to the mobile station. The transmission power is controlled in the following way. A mobile station receives a cell identification signal sent from the femtocell base station and calculates the downstream data rate according to the receiving quality of the cell identification signal, and the femtocell base station receives the downstream data rate from the mobile station and controls the transmission power 703 according to the downstream data rate. According to FIG. 7, when all mobile station registered at the femtocell base station are in a connection state in the cell area covered by the femtocell base station, the transmission power 703 of the femtocell base station is adjusted according to the downstream data rate for the mobile stations, calculated according to the receiving signal quality of a signal sent from the femtocell base station.

FIG. 8 shows an actual example to which the transmission power control method shown in FIG. 7 is applied. In FIG. 8, a transmission power control example is illustrated in which all mobile stations registered in advance for communication service are in connection states with the femtocell base station. Transmission power P_1 (801) and transmission power P_2 (802) indicate the minimum transmission power necessary for a mobile station A (803) and a mobile station B (804), respectively, to obtain the maximum data rate shown in FIG. 2 and FIG. 4. Since all the mobile stations registered at the femtocell base station, the mobile station A (803) and the mobile station B (804), are all connected to the femtocell base station, the transmission power of the femtocell base station is controlled according to the minimum transmission power P_1 (801) necessary for the mobile station B (804), which needs the highest transmission power, to obtain the maximum data rate shown in FIG. 2 and FIG. 4. Details of the transmission power control method for the femtocell base station will be described later, with reference to FIG. 12, which shows a block diagram of the femtocell base station, and FIG. 14, which shows a flowchart of the transmission power control algorithm of the femtocell base station. The transmission power is reduced from the conventional level, P_MAX, to P_1 by adjusting the transmission power of the femtocell base station for all downstream signals that include a pilot signal, as shown in the example in FIG. 8, reducing the power consumption by the amount of power indicated by a reference numeral 805 in the figure in the femtocell base station. In addition, since reducing the transmission power of the femtocell base station reduces the cell area of the femtocell base station from the conventional cell area 504 to the cell area 505, as shown in FIG. 5, interference with other macrocell base stations and other femtocell base stations located nearby is reduced.

2.3 Case 3: When Only One or Some of Registered Mobile Stations are in Connection States FIG. 9 to FIG. 11 show a transmission power control method and transmission power control examples used when mobile stations are registered in advance at a corresponding closed-type femtocell base station and only one or some of the registered mobile stations are in connection states in the closed-type femtocell base station system according to the present embodiment.

Figure 9:
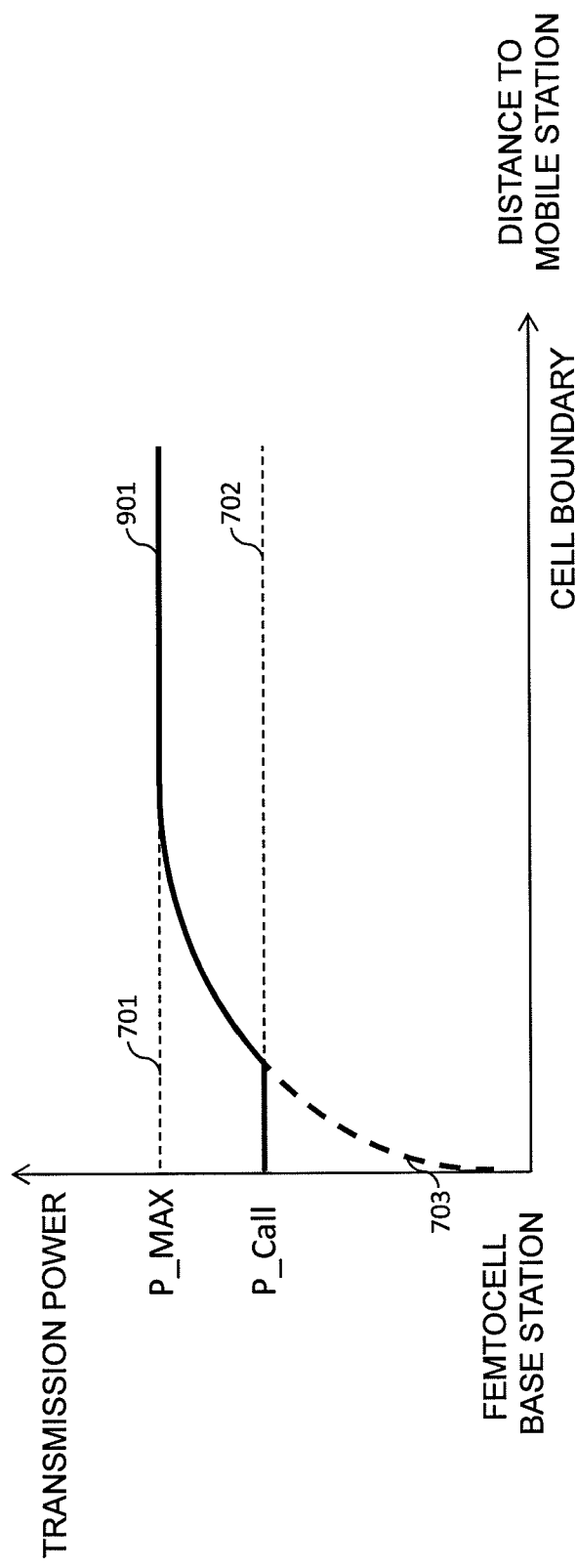
FIG. 9 shows transmission power control used in the femtocell base station according to the present embodiment when only one or some of all the mobile stations are in connection states.

FIG. 9 shows constant transmission power stipulated in the femtocell base station, P_MAX (701); the minimum transmission power necessary for a mobile station to make a call in the cell area of the femtocell base station, P_Call (702); and transmission power 901 for all downstream signals that include a pilot signal and data, of the femtocell base station, based on the downstream data rate calculated according to the receiving signal quality at a mobile station in the present embodiment. In FIG. 9, since only one or some of the mobile stations are in connection states, transmission power for all downstream signals that include a pilot signal is controlled with the minimum transmission power, P_Call (702), necessary for a mobile station that is not connected to the femtocell base station to make a call when it appears at any location in the cell area.

Figure 10:
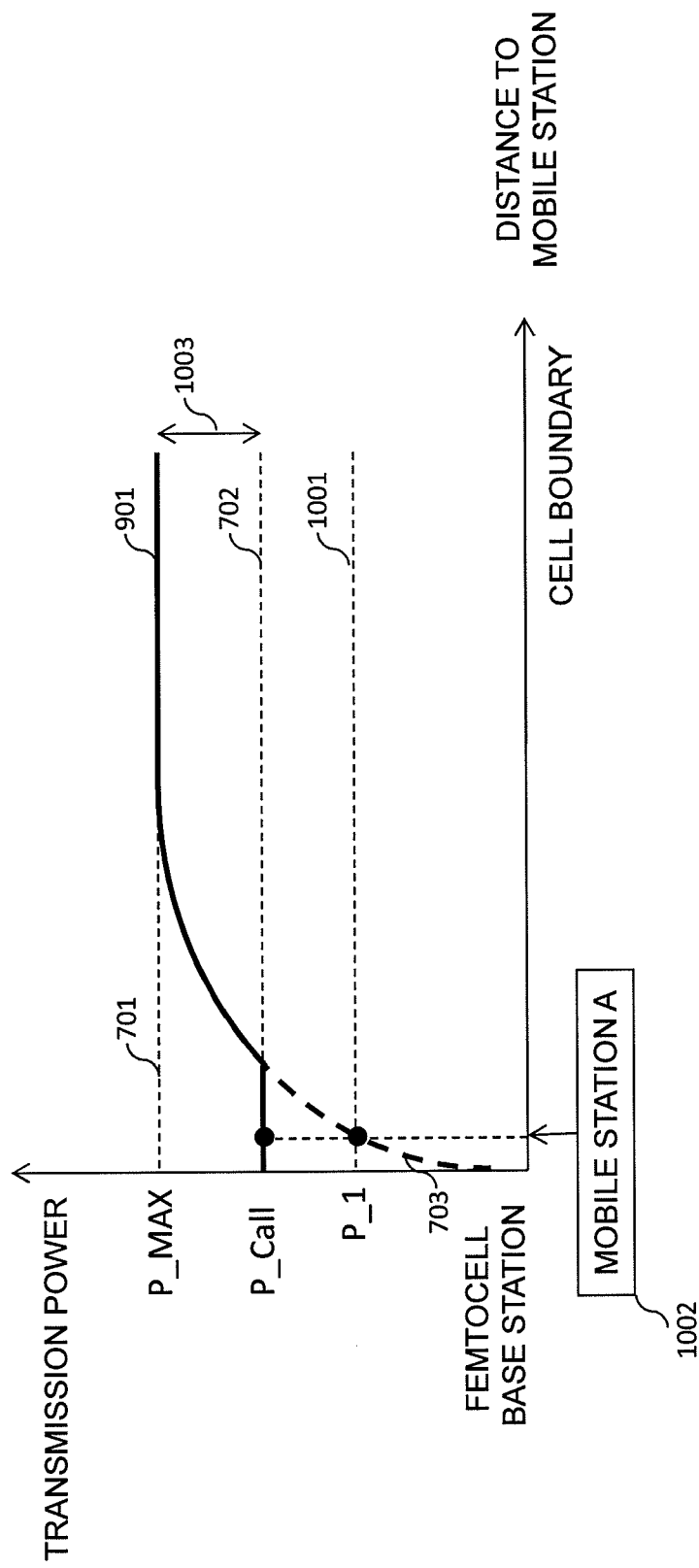
FIG. 10 shows a first transmission power control example used in the femtocell base station according to the present embodiment when only one or some of all the mobile stations are in connection states.

FIG. 10 shows an actual example of the transmission power control method for all the downstream signals that include a pilot signal, used when only one or some of the mobile stations registered in advance at the femtocell base station are in connection states. In this example, only a mobile station A (1002) is connected to the femtocell base station among all the mobile stations registered in advance for communication service. Although the transmission power necessary for the mobile station A (1002) to maintain the maximum data rate shown in FIG. 2 and FIG. 4 is transmission power P_1 (1001), a pilot signal is sent from the femtocell base station with the minimum transmission power P_Call (702) necessary for a mobile station to make a call so that a mobile station registered in advance for the communication service at the femtocell base station but not yet in a connection state can connect to the femtocell base station any time. Also in the example shown in FIG. 10, reducing the transmission power of the femtocell base station from P_MAX to P_Call reduces the transmission power by the power indicated by a reference numeral 1003 in the figure in the femtocell base station. In addition, since reducing the transmission power of the femtocell base station reduces the cell area of the femtocell base station from the conventional cell area 504 to the cell area 505, as shown in FIG. 5, interference with other macrocell base stations and other femtocell base stations located nearby is reduced.

Figure 11:
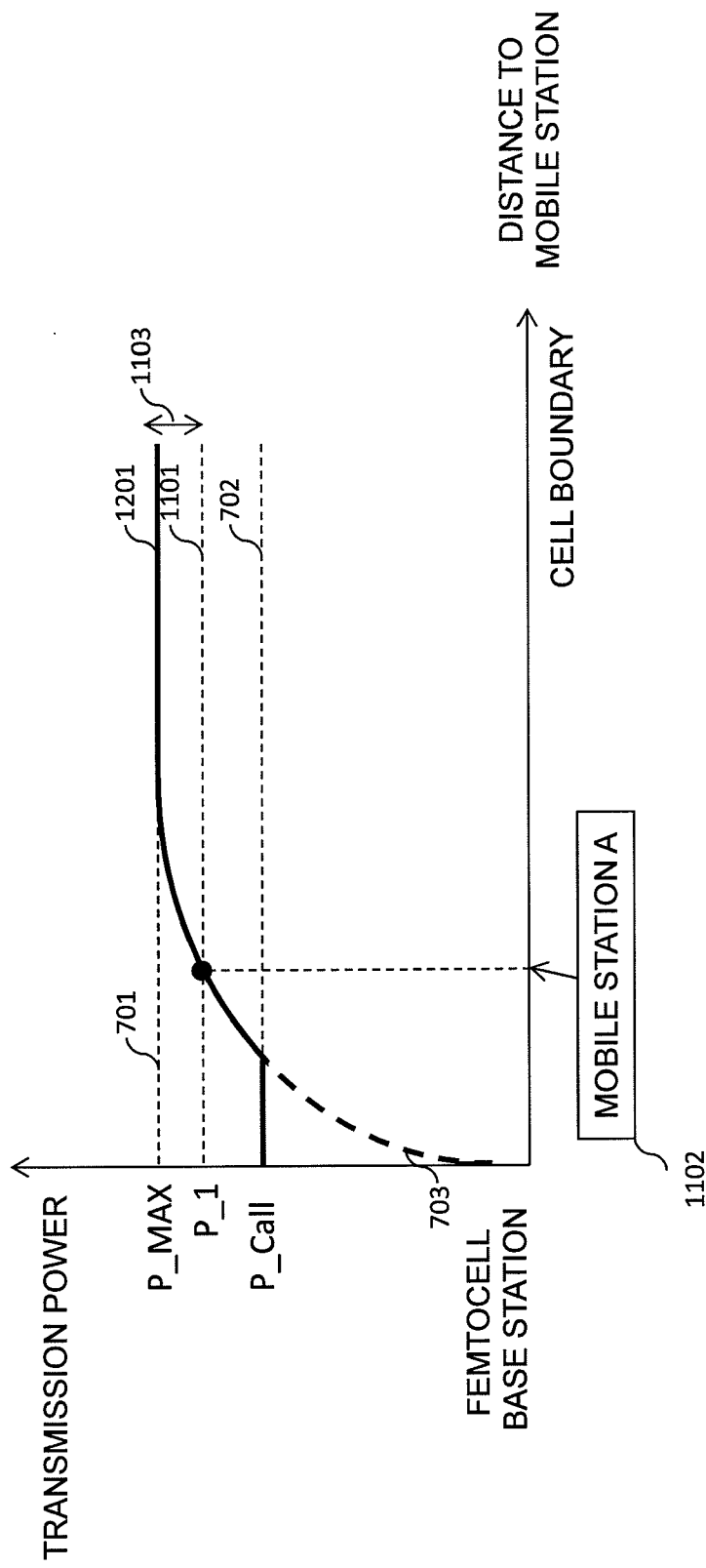
FIG. 11 shows a second transmission power control example used in the femtocell base station according to the present embodiment when only one or some of all the mobile stations are in connection states.

FIG. 11 also shows a power control example used when only one or some of mobile stations registered in advance at the femtocell base station are in connection states, in the same manner as in FIG. 10. In this example, only a mobile station A (1102) is connected to the femtocell base station among all the mobile stations registered in advance for communication service. In FIG. 11, the transmission power necessary for the mobile station A (1102) to maintain the maximum data rate shown in FIG. 2 and FIG. 4 is transmission power P_1 (1101). In this example, since the transmission power P_1 is higher than the minimum transmission power P_Call (702) necessary for a mobile station to make a call in the cell area of the femtocell base station, even a mobile station that has not yet made a call can make a call any time if it is located in the cell area. Also in the example shown in FIG. 11, reducing the transmission power of the femtocell base station from P_MAX to P_1 reduces the transmission power by the power indicated by a reference numeral 1103 in the figure in the femtocell base station. In addition, since reducing the transmission power of the femtocell base station reduces the cell area of the femtocell base station from the conventional cell area 504 to the cell area 505, as shown in FIG. 5, interference with other macrocell base stations and other femtocell base stations located nearby is reduced.

3. Configuration of a Base Station and a Mobile Station and Flowchart

The configurations of the femtocell base station and a mobile station according to the present embodiment will be described below with reference to FIG. 12 and FIG. 13.

Figure 12:
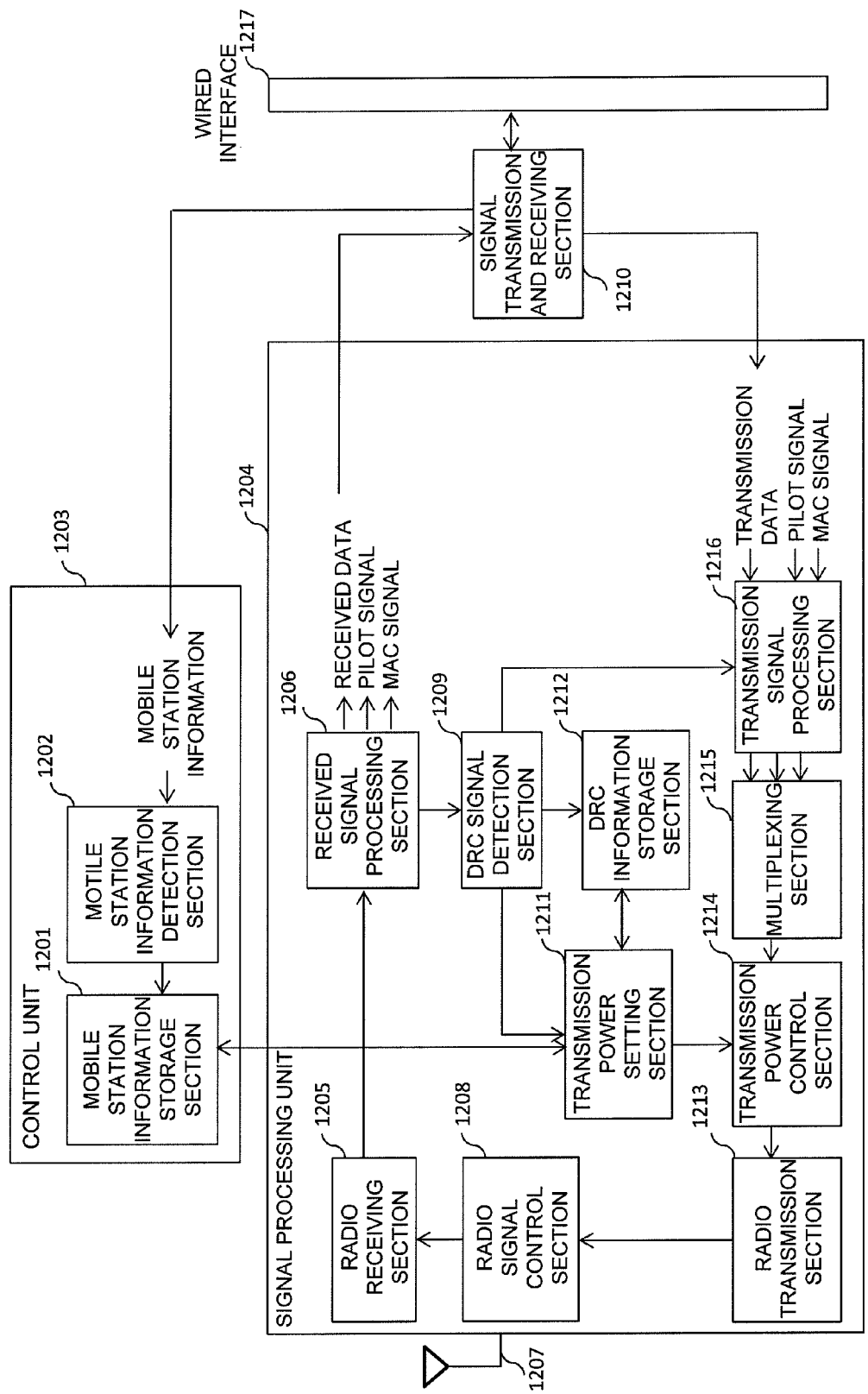
FIG. 12 is a block diagram of the closed-type femtocell base station according to the present embodiment.

FIG. 12 is a block diagram of the femtocell base station according to the present embodiment. The femtocell base station includes a control unit 1203 and a signal processing unit 1204. The control unit 1203 is a logical block for managing and controlling the femtocell base station according to the configurations set by the communication provider. The signal processing unit 1204 is a logical block for processing signals such as data received from a mobile station and data to be sent to a mobile station. The control unit 1203 includes a mobile station information storage section 1201 and a mobile station information detection section 1202. The mobile station information detection section 1202 detects information about (the registrant of) a mobile station registered at the femtocell base station. The mobile station information storage section 1201 stores the detected mobile station information, and sends information, such as the number of stored registrants and the number of currently connected registrants, to a transmission power setting section 1211 of the signal processing unit 1204 when the transmission power setting section 1211 requests to do so. The configuration of the signal processing unit 1204 will be described next. A radio receiving section 1205 converts a signal received from a radio signal control section 1208 to a baseband signal and outputs the converted signal to a received signal processing section 1206. The received signal processing section 1206 applies processes, such as despreading, demodulation, and decryption, to received data, which has already been converted to the baseband signal in the radio receiving section 1205, and outputs received data, a pilot signal, and a MAC signal. A DRC signal detection section 1209 detects downstream data rate information in a signal sent from the received signal processing section 1206 and stores the detected downstream data rate information for each mobile station in a DRC information storage section 1212. The DRC information storage section 1212 outputs the stored downstream data rate information for each mobile station to the transmission power setting section 1211 when the transmission power setting section 1211 requests to do so. A transmission power setting section 1211 uses the mobile station information sent from the mobile station information storage section 1201 and the downstream data rate information for each mobile station sent from the DRC information storage section 1212 to set the transmission power. The transmission power set in the transmission power setting section 1211 is output to a transmission power control section 1214. A detailed algorithm for setting the transmission power in the transmission power setting section 1211 will be described later. A transmission signal processing section 1216 applies processes, such as encoding, modulation, and spreading, to transmission data, a pilot signal, and a MAC signal to be sent to the mobile station, according to the downstream data rate information detected by the DRC signal detection section 1209. The transmission data, the pilot signal, and the MAC signal to which the processes have been applied in the transmission signal processing section 1216 are output to a multiplexing section 1215. The multiplexing section 1215 multiplexes the signals processed in the transmission signal processing section 1216 and outputs a resultant signal to the transmission power control section 1214. The transmission power control section 1214 amplifies the transmission power of the multiplexed signal in the multiplexing section 1215, according to the transmission power set in the transmission power setting section 1211, and outputs the amplified signal to a radio transmission section 1213. The radio transmission section 1213 converts the signal, which is the output from the transmission power control section 1214, to a signal having a radio frequency and outputs it to a radio signal control section 1208. The radio signal control section 1208 sends the transmission signal, which has been converted to the radio signal in the radio transmission section 1213, to the mobile station through an antenna 1207. A signal transmission and receiving section 1210 exchanges data and control signals that include registrant information registered at the femtocell base station and other information between a control equipment for the femtocell base station, and the received signal processing section 1206, the transmission signal processing section 1216, or the control unit 1203 of the femtocell base station, through an interface 1217.

Figure 13:
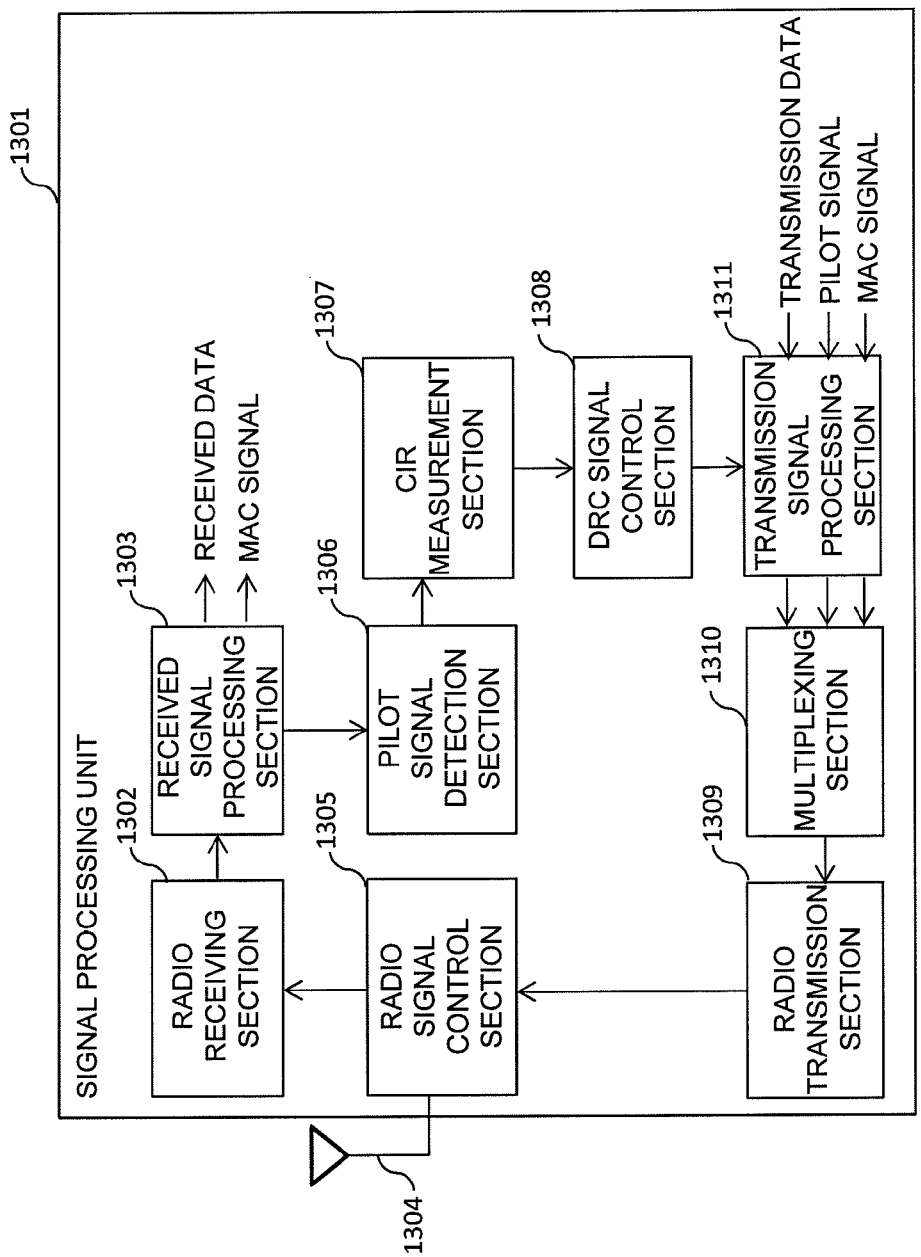
FIG. 13 is a block diagram of a mobile station.

FIG. 13 is a block diagram of a signal processing unit 1301 in the mobile station according to the present embodiment. A radio receiving section 1302 converts a signal received from a radio signal control section 1305 to a baseband signal and outputs the converted signal to a received signal processing section 1303. The received signal processing section 1303 applies processes, such as despreading, demodulation, and decryption, to the received data, which has been converted to the baseband signal in the radio receiving section 1302, and outputs the resultant signals. A pilot signal detection section 1306 detects a pilot signal from a signal sent from the received signal processing section 1303 and outputs the pilot signal to a CIR measurement section 1307. CIR stands for the carrier-to-interference ratio and is used as a scale for measuring the receiving quality of a pilot signal sent from the femtocell base station. The mobile station calculates the downstream data rate of downstream receiving data sent from the femtocell base station, according to the measured CIR, and sends it to the base station. A DRC signal control section 1308 determines the downstream data rate (DRC information), according to the CIR, which indicates the receiving quality of a pilot signal, output from the CIR measurement section 1307, as described above. A transmission signal processing section 1311 applies processes, such as encoding, modulation, and spreading, to transmission data, a pilot signal, and a MAC signal as well as the downstream data rate (DRC information) determined in the DRC signal control section 1308 and outputs resultant signals to a multiplexing section 1310. The multiplexing section 1310 multiplexes these signals and outputs a resultant signal to a radio transmission section 1309. The radio transmission section 1309 converts the signal to be transmitted to a signal having a radio frequency, and outputs the converted signal to the radio signal control section 1305. The radio signal control section 1305 sends the converted transmission signal to the femtocell base station through an antenna 1304.

Figure 14:
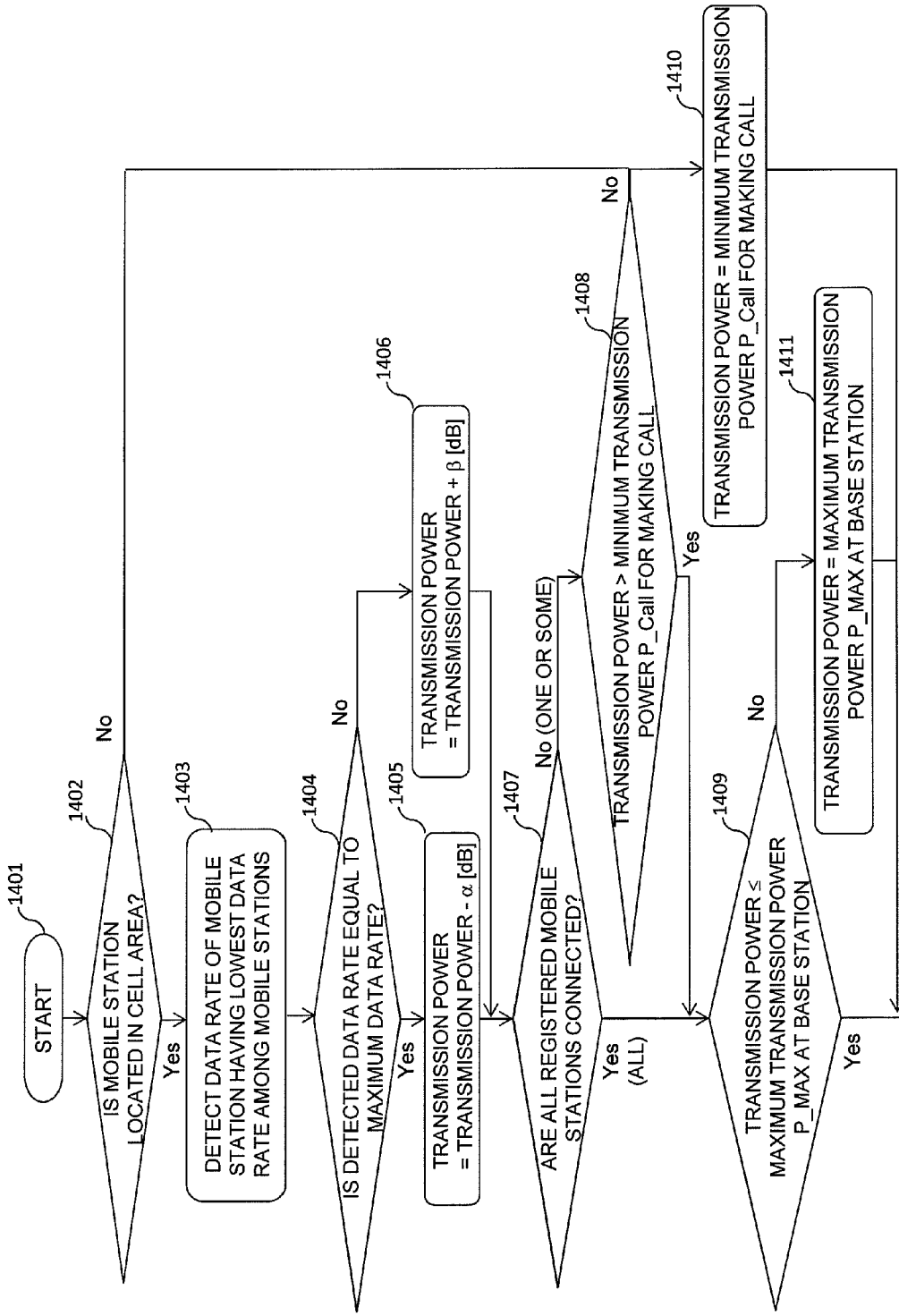
FIG. 14 is a flowchart showing the algorithm of transmission power control according to the present embodiment.

FIG. 14 shows an algorithm for setting the transmission power in the transmission power setting section 1211 of the signal processing unit 1204 of the femtocell base station shown in FIG. 12. The transmission power setting section 1211 regularly activates the following transmission power setting algorithm in step 1401. The femtocell base station determines whether a registered mobile station (registrant) is located in the cell area (step 1402), by acquiring information about a registrant connected to the femtocell base station, from the mobile station information storage section 1201 shown in FIG. 12. The femtocell base station determines whether a registrant is located in the cell area, and if no registrant is located in the cell area, that is, if no mobile station registered at the femtocell base station is located in the cell area, the femtocell base station needs to send a pilot signal with the minimum transmission power P_Call necessary for a mobile station to make a call when a mobile station registered at the femtocell base station appears in the cell area, as described with reference to FIG. 16. To do so, the transmission power setting section 1211 sets the transmission power for all downstream signals that include a pilot signal to the minimum transmission power P_Call necessary for a mobile station to make a call in the cell area of the femtocell base station (step 1410) and finishes the algorithm. When a registrant is located in the cell area of the femtocell base station in step 1402, that is, when one or some, or all of mobile stations registered at the femtocell base station are located in the cell area of the femtocell base station, the transmission power setting section 1211 proceeds from step 1402 to step 1403 and executes the process of step 1403. In step 1403, the transmission power setting section 1211 references the DRC information storage section 1212, which stores the downstream data rate of each mobile station (registrant), to detect the lowest downstream data rate among DRCs held by the mobile stations connected to the femtocell base station (step 1403). Next, in step 1404, it is determined (in step 1404) whether a mobile station keep maintaining the maximum data rate shown in FIG. 2 and FIG. 4 among the mobile stations connected to the femtocell base station, according to the downstream data rate of the mobile station, detected in step 1403. If a mobile station cannot maintain the maximum data rate (if no in step 1404), it is necessary to increase the transmission power for transmission signals sent from the femtocell base station in order that the mobile station can maintain the maximum data rate. When all the mobile stations maintain the maximum data rate (if yes in step 1404), the transmission power for all downstream signals that include a pilot signal and data sent from the femtocell base station is reduced to reduce the power consumption of the femtocell base station and also to reduce interference with other base stations. An increase amount β and a decrease amount α of the transmission power can be determined appropriately in advance, and may be set to the same value or different values. In step 1405, the transmission power of the femtocell base station is decreased, and in step 1406, the transmission power of the femtocell base station is increased. Then, the transmission power setting section 1211 of the femtocell base station determines (in step 1407) whether all the mobile stations (all the registrants) allowed to connect to the femtocell base station are connected, or only one or some of the mobile stations (registrants) are connected. If not all of the mobile stations registered in advance at the femtocell base station are connected, that is, if only one or some of the mobile stations are connected to the femtocell base station (if no in step 1407), it is necessary to send a pilot signal with the minimum transmission power P_Call necessary for a mobile station not yet connected to find the femtocell base station and to make a call. To do so, if not all of the mobile stations registered in advance at the femtocell base station are connected, that is, if only one or some of the mobile stations are connected to the femtocell base station, the transmission power setting section 1211 determines (in step 1408) whether the transmission power set in step 1405 or in step 1406 in the femtocell base station is higher than the minimum transmission power P_Call necessary for a mobile station to make a call in the cell area. If the transmission power set in the femtocell base station is lower than the minimum transmission power P_Call necessary for a mobile station to make a call in the cell area in the determination in step 1408 (if no in step 1408), the transmission power setting section 1211 sets the transmission power of the femtocell base station to the minimum transmission power P_Call necessary for a mobile station to make a call (step 1410) to allow a mobile station registered in advance, but not yet connected, at the femtocell base station to connect to the femtocell base station when it appears in the cell area. When the transmission power set in the femtocell base station is higher than the minimum transmission power P_Call necessary for a mobile station to make a call in the cell area in the determination in step 1408 (when yes in step 1408), the transmission power setting section 1211 proceeds to step 1409. When all the mobile stations registered in advance at the femtocell base station are in connection states in step 1407, the transmission power setting section 1211 proceeds to step 1409. In step 1409, if the transmission power of the femtocell base station, set according to the transmission power setting algorithm, is higher than the maximum power P_MAX stipulated in the femtocell base station (if no in step 1409), the transmission power setting section 1211 sets the transmission power to the maximum power P_MAX stipulated in the femtocell base station (step 1411) and finishes the algorithm (step 1412). When the transmission power of the femtocell base station, set according to the transmission power setting algorithm, is equal to or lower than the maximum power P_MAX stipulated in the femtocell base station (when yes in step 1409), the transmission power setting section 1211 finishes the algorithm (step 1412).

4. Power Control Example

Figure 16:
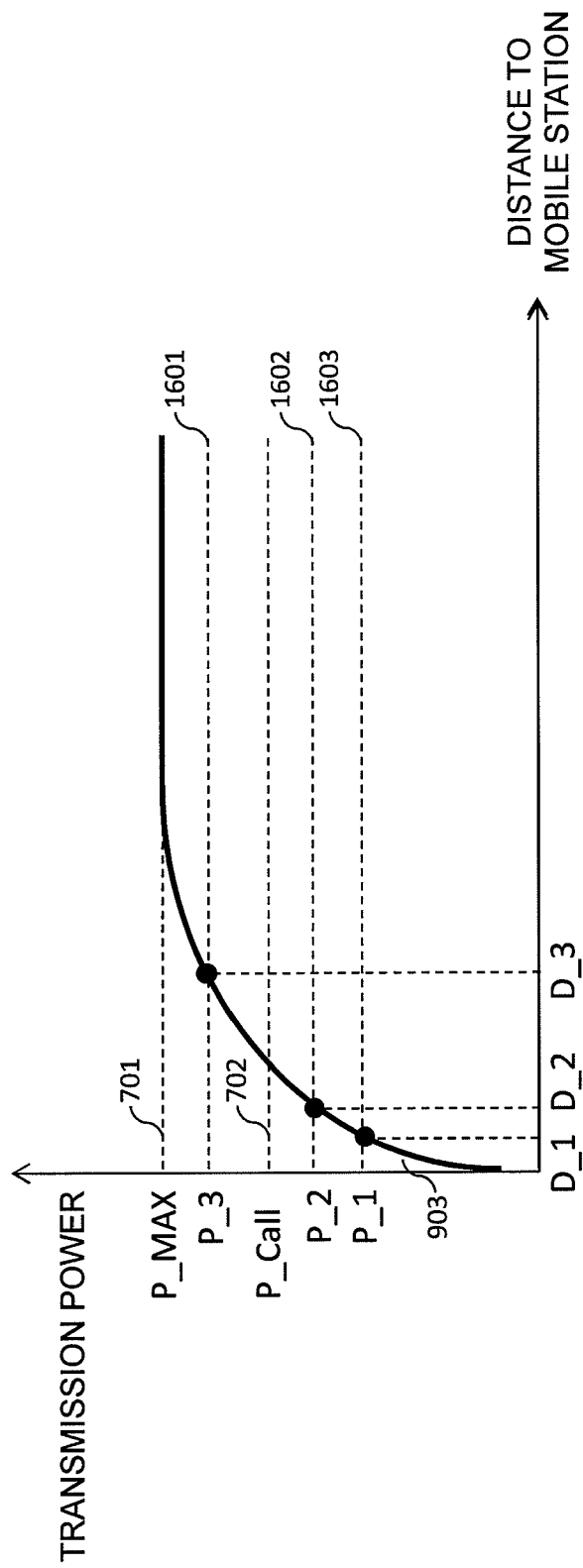
FIG. 16 shows the transmission power of the femtocell base station in the embodiment of the present invention.
Figure 17:
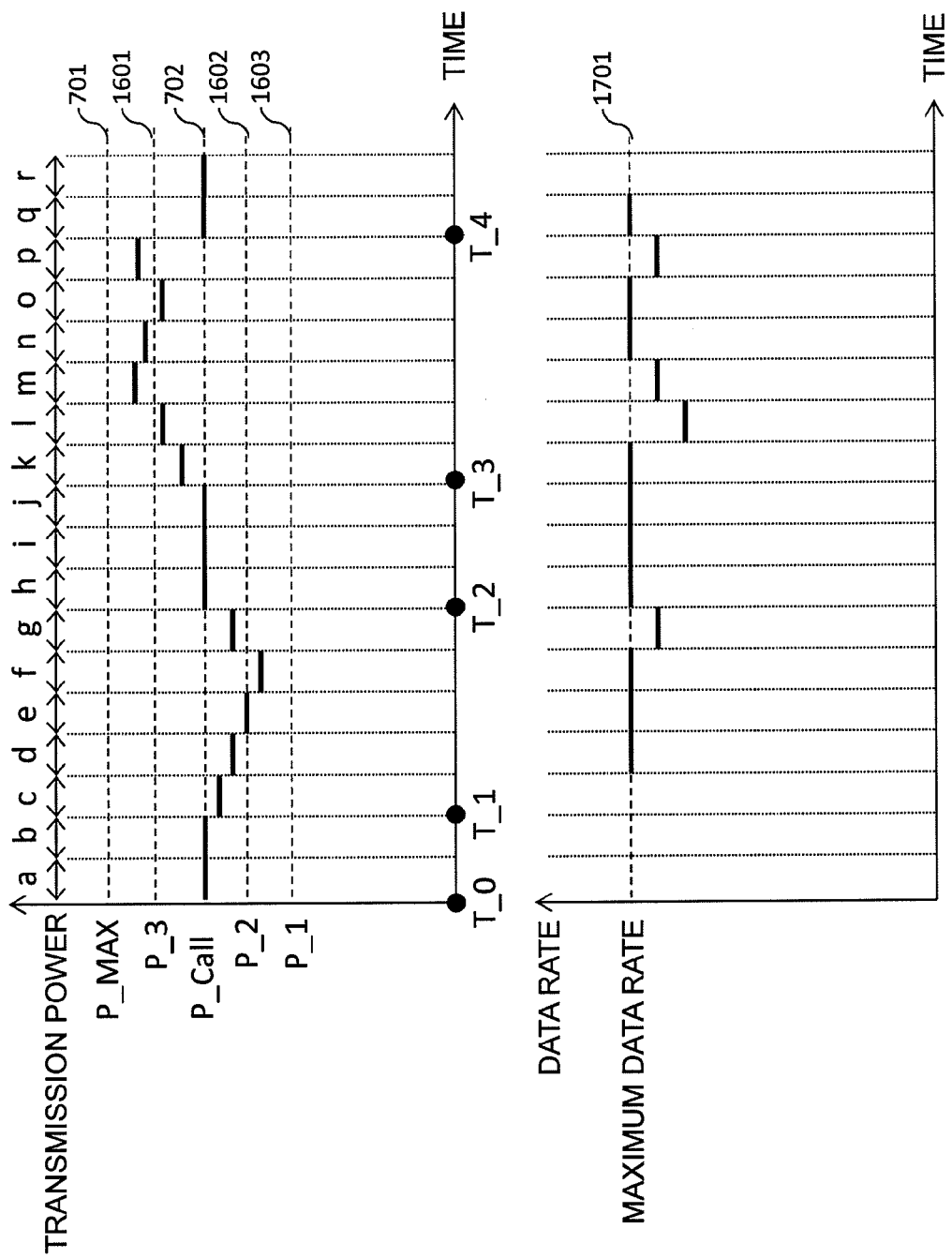
FIG. 17 shows the transmission power of the femtocell base station and the downstream data rate received from mobile stations in the embodiment of the present invention.

FIG. 15 to FIG. 17 illustrate an example of transmission power control in the closed-type femtocell base station according to the present embodiment.

FIG. 15 shows a table in which mobile stations connected to the femtocell base station at each time are indicated. In this example, it is assumed that only a mobile station A and a mobile station B have been registered at the femtocell base station. In the table, D_1, D_2, and D_3 indicate the distances from the femtocell base station to the mobile stations. It is assumed here that the path loss increases in proportion to the distance. At time T_0, no mobile station is connected. At time T_1, the mobile station A is located at D_1 and is connected to the femtocell base station, and the mobile station B is located at D_2 and is connected to the femtocell base station. At time T_2, only the mobile station A is connected to the femtocell base station while it is located at D_1. At time T_3, the mobile station A is located at D_1 and is connected to the femtocell base station, and the mobile station B is located at D_3 and is connected to the femtocell base station. At time T_4, no mobile station is connected.

FIG. 16 shows the minimum transmission power required according to the distances from the femtocell base station to the mobile stations. The following description assumes that the distances D_1, D_2, and D_3 from the femtocell base station to the mobile stations have a relationship of D_1<D_2<D_3. In addition, it is assumed that the path losses in the radio zones from the femtocell base station to the mobile stations occur in proportion to the distances D_1, D_2, and D_3 from the femtocell base station to the mobile stations. To recover the path losses, the femtocell base station needs to increase the transmission power. FIG. 16 illustrates that, in order to maintain the maximum data rate shown in FIG. 2 and FIG. 4 at the mobile stations, the transmission power for all downstream signals that include a pilot signal needs to be set to P_1, P_2, and P_3 or higher according to the distances from the femtocell base station to the mobile stations, and a relationship of $P\_1<P\_2<P\_3$ is satisfied.

FIG. 17 shows the transmission power control of the femtocell base station and the lowest data rate among the downstream data rates obtained from the mobile stations connected to the femtocell base station. The transmission power of the femtocell base station is set according to the downstream data rate at each mobile station. FIG. 17 shows an example in which the transmission power for all downstream signals that include a pilot signal is regularly controlled in the femtocell base station according to the lowest downstream data rate. In FIG. 17, the femtocell base station sets the transmission power by regularly activating the transmission power setting algorithm shown in FIG. 14. FIG. 17 shows that the femtocell base station controls the transmission power regularly at time periods a, b, c, d, e, f, g, h, i, j, k, l, m, n, o, p and q.

At time T\_0, none of the mobile stations registered at the femtocell base station is located in the cell area. Therefore, the femtocell base station sends signals with the minimum transmission power P\_Call necessary for a mobile station to make a call in the time periods a and b so that any mobile station can make a call any time inside of the cell coverage area. With reference to FIG. 14, since none of the mobile stations is located in the cell area in the time periods a and b, the transmission power setting section 1211 proceeds to step 1410 after the decision in step 1402 and sets the transmission power of the femtocell base station to the minimum transmission power P\_Call necessary for a mobile station to make a call anytime inside of the cell coverage area.

At time T\_1, the mobile stations A and B, which are all the mobile stations, appear at D\_3 and D\_2, respectively. Therefore, the transmission power is controlled in the time periods c, d, e, f, and g such that it approaches the transmission power P\_2 necessary for the mobile station B to maintain the maximum data rate shown in FIG. 2 and FIG. 4, which is the highest transmission power among the mobile stations. Since the transmission power of the femtocell base station becomes lower, in the time period f, than the transmission power P\_2 necessary for the mobile station B, which means the downstream data rate at the mobile station B is lower than the maximum data rate shown in FIG. 2 and FIG. 4, the transmission power is increased in the time period g according to the transmission power setting algorithm. With reference to FIG. 14, all the mobile stations registered in advance at the femtocell base station are in connection states in the time periods c, d, e, f, and g. Therefore, in FIG. 14, the transmission power setting section 1211 determines (in step 1402) that a mobile station is located in the cell area of the femtocell base station, proceeds to step 1403, detects the data rate of a mobile station having the lowest data rate among the connected mobile stations, determines (in step 1404) whether the detected data rate is equal to the maximum data rate, and adjusts the transmission power of the femtocell base station either by decreasing the transmission power by α (dB) in step 1405 or by increasing the transmission power by β (dB) in step 1406. In addition, the transmission power setting section 1211 sets the transmission power to P\_MAX or lower through steps 1407 and 1409.

At time T\_2, only the mobile station A is in the connection state at D\_1 among all the mobile stations registered at the femtocell base station. Therefore, the femtocell base station needs to send signals with the minimum transmission power P\_1 necessary for the mobile station A or higher. Since only one of the mobile stations is in the connection state, the minimum transmission power P\_1 needs to be compared with the minimum transmission power P\_Call necessary for any mobile station to make a call in order for the femtocell base station to use whichever is the higher. In this example, since the transmission power P\_Call is higher than the transmission power P\_1, the transmission power is set to the transmission power P\_Call and signals are sent in the time periods h, i, and j. With reference to FIG. 14, only the mobile station A, which is one of the mobile stations registered in advance at the femtocell base station, is in the connection state in the time periods h, i, and j. Therefore, in FIG. 14, the transmission power setting section 1211 determines (in step 1402) that a mobile station is located in the cell area of the femtocell base station, proceeds to step 1403, detects the data rate of a mobile station having the lowest data rate among the connected mobile stations, determines (in step 1404) whether the detected data rate is equal to the maximum DRC, and adjusts the transmission power of the femtocell base station either in step 1405 or in step 1406. Since the transmission power already exceeds, in the time period g, the transmission power P\_1 necessary for the mobile station A to obtain the maximum data rate, however, the transmission power setting section 1211 reduces the transmission power of the femtocell base station (step 1405). The transmission power setting section 1211 determines (in step 1407) that only one of the mobile stations registered in advance is located in the cell of the femtocell base station, and proceeds to step 1408. Since the transmission power of the femtocell base station is lower than the minimum transmission power P\_Call necessary for a mobile station, which has not yet connected to the femtocell base station, to make a call in step 1408, the transmission power setting section 1211 proceeds to step 1410, sets the transmission power to the minimum transmission power P\_Call necessary for a mobile station to make a call, and finishes the transmission power setting algorithm.

At time T\_3, the mobile stations A and B, which are all the mobile stations, appear at D\_1 and D\_3, respectively. Therefore, the transmission power is controlled in the time periods k, l, and m such that it approaches the transmission power P\_3 necessary for the mobile station B to maintain the maximum data rate shown in FIG. 2 and FIG. 4, which is the highest transmission power among the mobile stations. In the time periods m and n, however, since both the mobile stations A and B can maintain the maximum data rate shown in FIG. 2 and FIG. 4 with the transmission power of the femtocell base station, the transmission power is reduced. In the time periods o and p, since the mobile station B cannot maintain the maximum data rate shown in FIG. 2 and FIG. 4 with the transmission power of the femtocell base station, the transmission power is again increased. With reference to FIG. 14, all the mobile stations registered in advance at the femtocell base station are in the connection states in the time periods k, l, m, n, and o. Therefore, in FIG. 14, the transmission power setting section 1211 determines (in step 1402) that a mobile station is located in the cell area of the femtocell base station, proceeds to step 1403, detects the data rate of a mobile station having the lowest data rate among the connected mobile stations, determines (in step 1404) whether the detected data rate is equal to the maximum data rate, and adjusts the transmission power of the femtocell base station either by decreasing the transmission power by α (dB) in step 1405 or by increasing the transmission power by β (dB) in step 1406. In the time periods k and l, when the mobile station B appears in the cell area of the femtocell base station, the transmission power setting section 1211 determines (in step 1404) that the data rate of the mobile station B is lower than the maximum data rate, and increases the transmission power of the femtocell base station (step 1405). In the time periods m and n, the transmission power setting section 1211 determines (in step 1404) that the data rate of the mobile station B is equal to the maximum data rate, and decreases the transmission power of the femtocell base station (step 1406).

At time T_4, since none of all the mobile stations registered in advance at the femtocell base station is in the connection state, the transmission power is again set to P_Call. With reference to FIG. 14, since none of all the mobile stations registered in advance at the femtocell base station is located in the cell area in the time periods q and r, the transmission power setting section 1211 proceeds to step 1410 after the decision in step 1402, sets the transmission power of the femtocell base station to the minimum transmission power P_Call necessary for a mobile station to make a call, and finishes the transmission power setting algorithm.

FIG. 18 shows the data rates received by the femtocell base station from the mobile stations A and B under the transmission power control shown in FIG. 17. Since the transmission power always exceeds the minimum transmission power P_1 for the mobile station A to obtain the maximum data rate, the mobile station A always maintains the maximum data rate, 12, in possible data rates from the minimum data rate, 1, to the maximum data rate, 12, during the time periods when the mobile station A is located in the cell area of the femtocell base station. In contrast, since the transmission power is lower than the minimum transmission power P_2 for the mobile station B to maintain the maximum data rate in the time period f, the data rate of the mobile station B is reduced to 11 in the time period g. Also in the time periods, k, l, and o, since the transmission power is lower than the minimum transmission power P_3 for the mobile station B to obtain the maximum data rate, the mobile station B cannot obtain the maximum data rate in the time periods l, m, and n.

In the above-described embodiment, the description has been made according to the HRPD (high rate packet data) technology. The present invention can be applied to all radio technologies that use general radio methods, such as long term evolution (LTE), worldwide interoperability for microwave access (WiMAX), and a global system for mobile communication (GSM, registered trade mark). The present invention can be applied to these radio technologies because they have factors corresponding to the receiving signal quality and the downstream data rate used in the transmission power control in the present embodiment.

In addition, the present invention can be applied to code division multiple access (CDMA), time division multiple access (TDMA), frequency division multiple access (FDMA), orthogonal frequency-division multiple access (OFDMA) and other appropriate radio technologies.

In the present embodiment, a cell identification signal or a pilot signal, and data are used in the description. An appropriate control signal or an appropriate control channel signal, and appropriate data signal or an appropriate data channel signal can be used instead, respectively, of, for example, the cell identification signal (control signal, control channel signal etc.) or the data (data channel signal etc.).

What is claimed is:

1. A radio communication system comprising a base station that provides communication service only for a plurality of mobile stations registered in advance,
the base station comprising:
a transmission power setting section for setting transmission power for a control channel signal and a data channel signal according to a transfer rate received from one or a plurality of mobile stations and the connection states of the one or the plurality of mobile stations; and
a transmission power control section for controlling the transmission power for the control channel signal and the data channel signal according to the transmission power setting section;
wherein the transmission power setting section sets the transmission power for the control channel signal and the data channel signal to power required by a mobile station that requires the highest power in order to obtain the maximum data rate stipulated by the base station or to power necessary for a mobile station having the lowest transfer rate to satisfy a desired quality determined in advance and a desired transfer rate determined in advance, when all of the plurality of mobile stations registered at the base station are in connection states; and
the transmission power setting section sets the transmission power for the control channel signal and the data channel signal to whichever is the higher of the minimum power necessary for each mobile station to make a call to the base station or power required by a mobile station that requires the highest power in order to obtain the maximum data rate stipulated by the base station, or whichever is the higher of the minimum power necessary for each mobile station to make a call to the base station or the power necessary for a mobile station having the lowest transfer rate to satisfy the desired quality and the desired transfer rate, when only one or some of the plurality of mobile stations registered at the base station is in a connection state.

2. A radio communication system according to claim 1, wherein the transmission power setting section sets the transmission power for the control channel signal and the data channel signal to the minimum power necessary for each mobile station to make a call to the base station, when none of the one or the plurality of mobile stations registered at the base station is in a connection state.

3. A radio communication system according to claim 1, wherein the transmission power setting section sets the transmission power for the control channel signal and the data channel signal to the maximum power (P_MAX) stipulated in the base station when the transmission power exceeds the maximum power (P_MAX).

4. A radio communication system according to claim 3, wherein the minimum power (P_Call) is the minimum power necessary for a mobile station to make a call in a cell area determined by the base station, and
the maximum power (P_MAX) stipulated in the base station is transmission power stipulated in order to obtain the maximum data rate in the cell area determined by the base station.

5. A radio communication system according to claim 1, wherein the transmission power setting section,
when one or more of the one or the plurality of mobile stations registered at the base station are in connection states,
detects a minimum-rate mobile station having the lowest transfer rate among the one or more mobile stations which are in connection states,
determines, according to the transfer rate of the detected minimum-rate mobile station, whether a mobile station that has not maintained the maximum data rate specified in advance by the base station exists among the mobile stations connected to the base station, and
increases the transfer power for the control channel signal and the data channel signal by an amount determined in advance when a mobile station that has not maintained the maximum data rate exists among the mobile stations connected to the base station, and decreases the transfer power for the control channel signal and the data channel signal by an amount determined in advance when all the mobile stations have maintained the maximum data rate.

6. A radio communication system according to claim 1, wherein the transmission power setting section regularly sets the transmission power for the control channel signal and the data channel signal according to the transfer rate and the connection states of the one or the plurality of mobile stations.

7. A radio communication system according to claim 1, wherein each of the mobile stations receives a pilot signal from the base station, calculates a downstream data rate according to receiving signal quality of the pilot signal, and sends the downstream data rate to the base station as the transfer rate.

8. A radio communication system according to claim 1, wherein code division multiple access (CDMA), time division multiple access (TDMA), frequency division multiple access (FDMA), or orthogonal frequency-division multiple access (OFDMA) is applied.

9. A radio communication method in a radio communication system comprising a base station that provides communication service only for a plurality of mobile stations registered in advance,
wherein the base station sets the transmission power for the control channel signal and the data channel signal to power required by a mobile station that requires the highest power in order to obtain the maximum data rate stipulated by the base station or to power necessary for a mobile station having the lowest transfer rate to satisfy a desired quality determined in advance and a desired transfer rate determined in advance, when all of the plurality of mobile stations registered at the base station are in connection states; and
the base station sets the transmission power for the control channel signal and the data channel signal to whichever is the higher of the minimum power necessary for each mobile station to make a call to the base station or power required by a mobile station that requires the highest power in order to obtain the maximum data rate stipulated by the base station, or whichever is the higher of the minimum power necessary for each mobile station to make a call to the base station or the power necessary for a mobile station having the lowest transfer rate to satisfy the desired quality and the desired transfer rate, when only one or some of the plurality of mobile stations registered at the base station is in a connection state.

10. A base station that provides communication service only for a plurality of mobile stations registered in advance, comprising:
a transmission power setting section for setting transmission power for a control channel signal and a data channel signal according to a transfer rate received from one or a plurality of mobile stations and the connection states of the one or the plurality of mobile stations; and
a transmission power control section for controlling the transmission power for the control channel signal and the data channel signal according to the transmission power setting section;
wherein the transmission power setting section sets the transmission power for control channel signal and the data channel signal to the power required by a mobile station that requires the highest power in order to obtain the maximum data rate stipulated by the base station or to power necessary for a mobile station having the lowest transfer rate to satisfy a desired quality determined in advance and a desired transfer rate determined in advance, when all of the plurality of mobile stations registered at the base station are in connection states; and
the transmission power setting section sets the transmission power for the control channel signal and the data channel signal to whichever is the higher of the minimum power necessary for each mobile station to make a call to the base station or power required by a mobile station that requires the highest power in order to obtain the maximum data rate stipulated by the base station, or whichever is the higher of the minimum power necessary for each mobile station to make a call to the base station or the power necessary for a mobile station having the lowest transfer rate to satisfy the desired quality and the desired transfer rate, when only one or some of the plurality of mobile stations registered at the base station is in a connection state.

11. A radio communication method according to claim 9, wherein the transmission power setting section sets the transmission power for the control channel signal and the data channel signal to the minimum power necessary for each mobile station to make a call to the base station, when none of the one or the plurality of mobile stations registered at the base station is in a connection state.

12. A radio communication method according to claim 9, wherein the transmission power setting section sets the transmission power for the control channel signal and the data channel signal to the maximum power (P_MAX) stipulated in the base station when the transmission power exceeds the maximum power (P_MAX).

13. A radio communication method according to claim 9, wherein the transmission power setting section,
when one or more of the one or the plurality of mobile stations registered at the base station are in connection states, detects a minimum-rate mobile station having the lowest transfer rate among the one or more mobile stations which are in connection states,
determines, according to the transfer rate of the detected minimum-rate mobile station, whether a mobile station that has not maintained the maximum data rate specified in advance by the base station exists among the mobile stations connected to the base station, and
increases the transfer power for the control channel signal and the data channel signal by an amount determined in advance when a mobile station that has not maintained the maximum data rate exists among the mobile stations connected to the base station, and decreases the transfer power for the control channel signal and the data channel signal by an amount determined in advance when all the mobile stations have maintained the maximum data rate.

14. A radio communication method according to claim 9, wherein the transmission power setting section regularly sets the transmission power for the control channel signal and the data channel signal according to the transfer rate and the connection states of the one or the plurality of mobile stations.

15. A radio communication method according to claim 9, wherein each of the mobile stations receives a pilot signal from the base station, calculates a downstream data rate according to receiving signal quality of the pilot signal, and sends the downstream data rate to the base station as the transfer rate.

* * * * *